US009504927B2

(12) United States Patent
Wilfong

(10) Patent No.: US 9,504,927 B2
(45) Date of Patent: Nov. 29, 2016

(54) TRANSPORTATION SYSTEM

(71) Applicant: Jay Robert Wilfong, Mount Juliet, TN (US)

(72) Inventor: Jay Robert Wilfong, Mount Juliet, TN (US)

(*) Notice: Subject to any disclaimer, the term of this patent is extended or adjusted under 35 U.S.C. 154(b) by 0 days.

(21) Appl. No.: 15/099,166

(22) Filed: Apr. 14, 2016

(65) Prior Publication Data
US 2016/0303486 A1 Oct. 20, 2016

Related U.S. Application Data

(60) Provisional application No. 62/147,125, filed on Apr. 14, 2015.

(51) Int. Cl.
*B62D 57/04* (2006.01)
*B60K 16/00* (2006.01)
*A63H 18/02* (2006.01)
*B62B 15/00* (2006.01)

(52) U.S. Cl.
CPC ............ *A63H 18/02* (2013.01); *B60K 16/00* (2013.01); *B62B 15/004* (2013.01); *B62D 57/04* (2013.01)

(58) Field of Classification Search
CPC .... A63H 18/02; A63H 18/025; A63H 18/06; A63H 18/16; A63C 2018/165; B60K 16/00; B60K 2016/006; B62D 57/04; B62B 15/001; B62B 15/002; B62B 15/003; B62B 15/004; B62B 15/005
USPC ....................... 180/2.1, 2.2; 280/1
See application file for complete search history.

(56) References Cited

U.S. PATENT DOCUMENTS

| | | | | |
|---|---|---|---|---|
| 4,117,900 A * | 10/1978 | Amick | ................... | B62D 35/00 180/7.1 |
| 5,120,070 A * | 6/1992 | Boyden | ................. | B62B 15/004 114/102.16 |
| 5,285,742 A * | 2/1994 | Anderson | ............ | B62B 15/001 114/279 |
| 7,445,225 B2 * | 11/2008 | Volk | ..................... | B62B 15/001 280/1 |

* cited by examiner

*Primary Examiner* — John Walters
(74) *Attorney, Agent, or Firm* — Dunlap Bennett & Ludwig PLLC

(57) ABSTRACT

A system of transportation is provided. The system embodies sail-equipped vehicles and vertically mounted, directional air fans, wherein a sail is attached along a framework of the vehicle so as to define an arcuate capture profile adapted to convert the downwardly directed air from the air fans into horizontal thrust, propelling the vehicles along a track.

8 Claims, 3 Drawing Sheets

US 9,504,927 B2

TRANSPORTATION SYSTEM

CROSS-REFERENCE TO RELATED APPLICATION

This application claims the benefit of priority of U.S. provisional application No. 62/147,125, filed 14 Apr. 2015, the contents of which are herein incorporated by reference.

BACKGROUND OF THE INVENTION

The present invention relates to transportation systems and, more particularly, to a method of transportation embodying sail-equipped wheeled vehicles and variable output forced air fans mounted around a closed circuit track.

Closed circuit race tracks primarily are used by wheeled racing vehicles powered by internal combustion engines. Motor racing is dangerous, loud, costly, and only available to a very small fraction of the general population due to age or physical restrictions and other limiting factors.

Competitive motor racing also results in a number of injuries and in particular head injuries and concussions, and joint and bone injuries are also commonplace.

Motor racing, being powered by internal combustion engines not geared for environmental concerns, emit carbon dioxide and other pollutants, diminishing the enjoyment and the health of the live audience.

As can be seen, there is a need for a system of transportation embodying sail-equipped vehicles and directional air fans, providing forms of racing that will reduce the number of injuries and be accessible to people of all ages, as well as providing a form of transportation for various commercial activities without emitting carbon dioxide or other pollutants.

SUMMARY OF THE INVENTION

In one aspect of the present invention, a transportation system includes a track; at least one vehicle, each vehicle having a base frame; an arcuate sail frame extending from a proximal end to a distal end, wherein the proximal end is transversely joined to a portion of the base frame so that the distal end is generally parallel with the base frame; and a sail attached along a periphery of the arcuate sail frame, wherein the sail defines a capture profile configured to convert non-horizontal air pressure into horizontal thrust; and a plurality of directional air fans, each directional air fan being mounted above the track so as to urge air at an obtuse angle relative to the track, wherein each directional air fan is configured to be selectively oriented in a first direction relative to a second direction of each of the other of the plurality of directional air fans, wherein the track may include a pin and groove capability between the track and each of the plurality of vehicles, and wherein the track is a closed circuit race course.

In another aspect of the present invention, a vehicle including a base frame; an arcuate sail frame extending from a proximal end to a distal end, wherein the proximal end is transversely joined to a portion of the base frame so that the distal end is generally parallel with the base frame; and a sail attached along a periphery of the arcuate sail frame, wherein the sail defines a capture profile configured to convert non-horizontal air pressure into horizontal thrust, wherein the sail frame further comprises a plurality of linear members, and wherein the sail defines an arcuate shape comprising linear portions.

In yet another aspect of the present invention, method of competitive racing on a closed circuit track using said transportation system, including the steps of configuring the track as a closed circuit track; providing a plurality of the at least one vehicles; and orienting each of the plurality of directional air fans so as to provide horizontal thrust to each vehicle along at least a portion of the track.

These and other features, aspects and advantages of the present invention will become better understood with reference to the following drawings, description and claims.

DETAILED DESCRIPTION OF THE INVENTION

Figure 1:
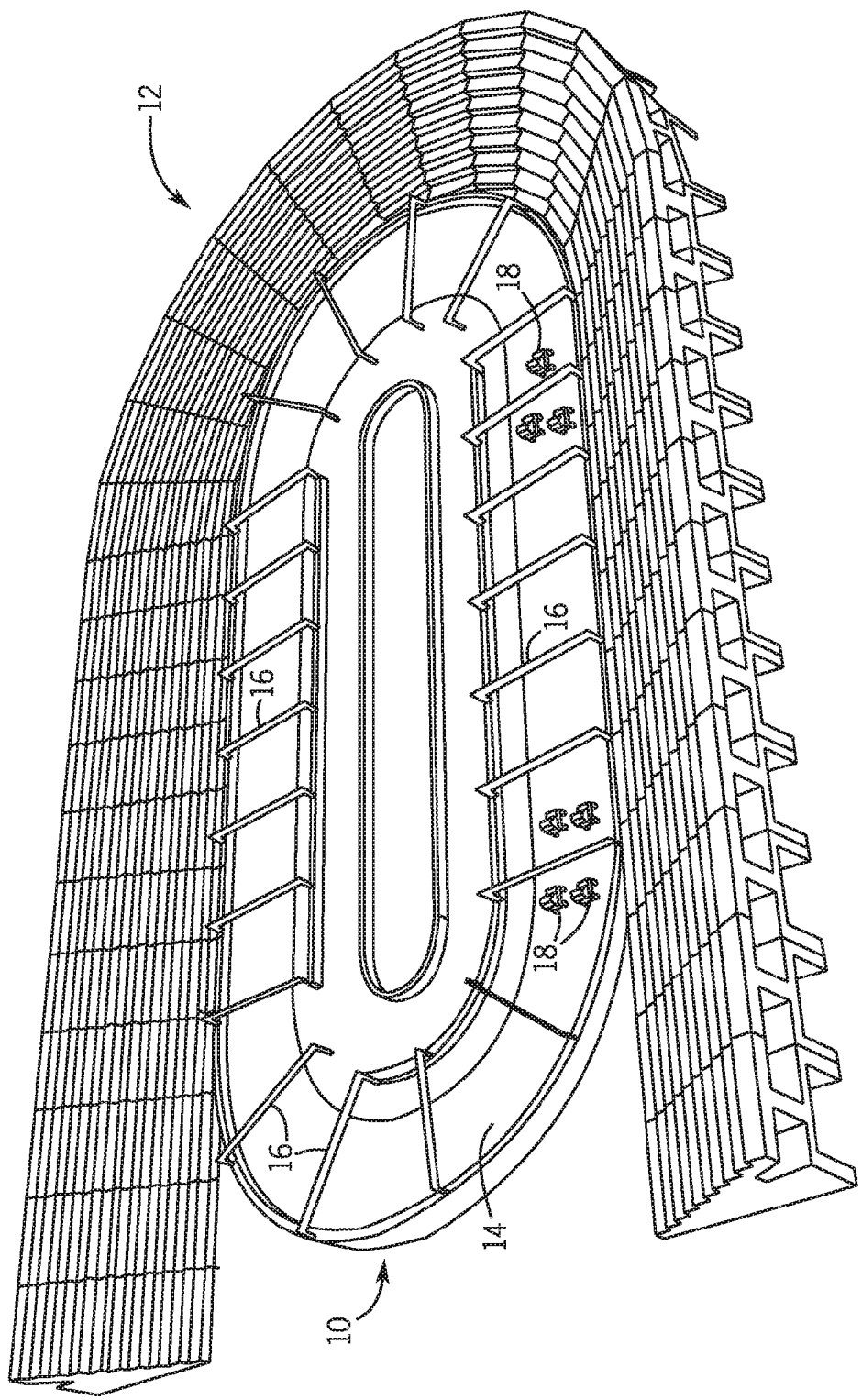
FIG. 1 is a perspective view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a system of transportation embodying sail-equipped vehicles and vertically mounted, directional air fans, wherein a sail is attached along a framework of the vehicle so as to define an arcuate capture profile adapted to convert the downwardly directed air from the air fans into horizontal thrust, propelling the vehicles along a track.

Referring to FIGS. 1 through 4, the present invention may include a transportation system 10 embodying sail-equipped vehicles 18 and a method of using variable-output, directional air fans 20 to propelling the sail-equipped vehicles along a track 14.

The sail-equipped vehicles 18 may include a framework 22 adapted to accommodate at least one passenger therein, and a plurality of wheels 26, a steering apparatus 28 and a sail 24 attached along the framework 22. The steering apparatus 28 may incorporate pin and groove guidance capability.

Figure 3:
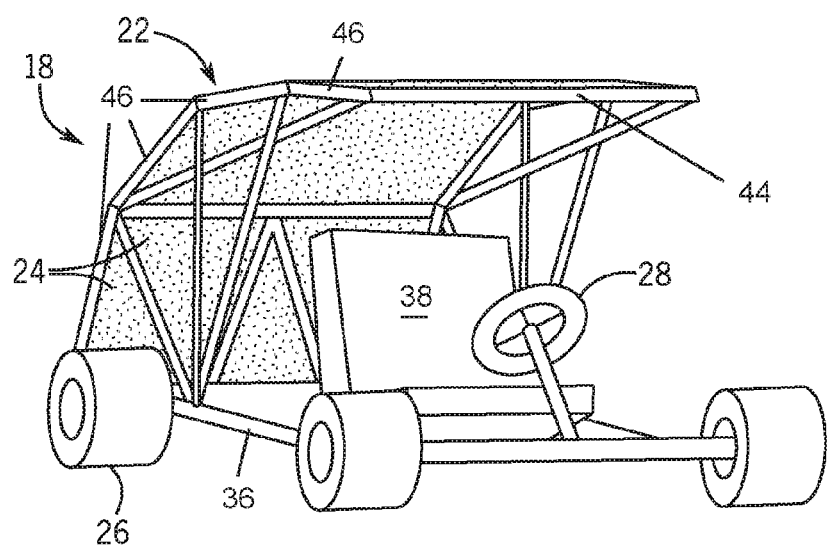
FIG. 3 is a perspective view of an exemplary embodiment of the present invention.
Figure 4:
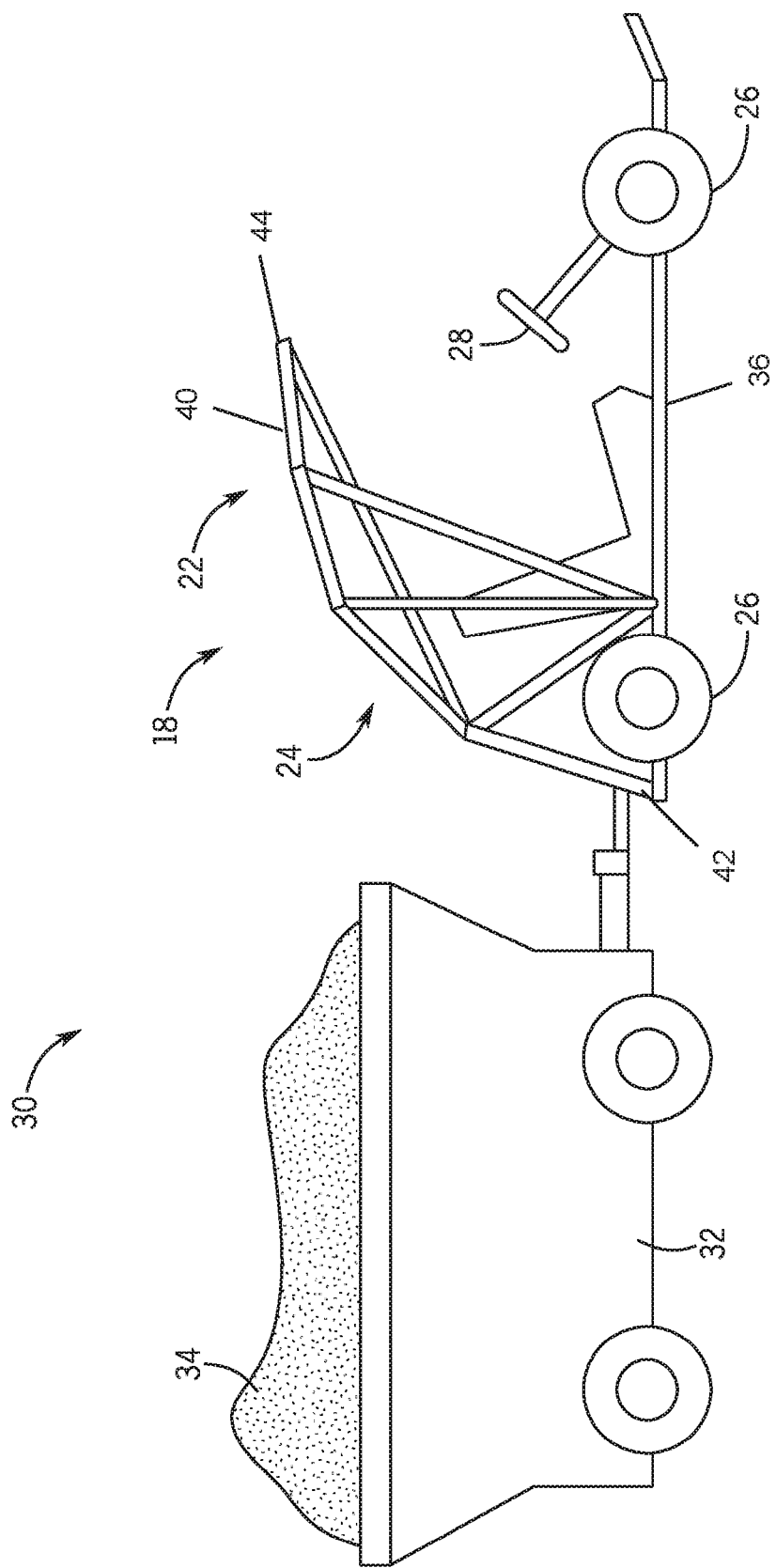
FIG. 4 is a side elevation view of an exemplary embodiment of the present invention.

The framework 22 may include a base frame 36 and a sail frame 40. The base frame 36 may operatively engage the plurality of wheels 26, the steering apparatus 28 and a support 38 for the at least one passenger. The sail frame 40 may extend "lengthwise" from a proximal end 42 to a distal end 44, as illustrated in FIGS. 3 and 4. The proximal end 42 may be attached to a rear portion of the base frame 36 so that the sail frame 40 overhangs the base frame 36 and passenger support 38, or a substantial portion thereof. The sail frame 40 extends "widthwise," providing a width generally matching a width of the base frame 36.

As the sail frame 40 extends from its proximal end 42 to its distal end 44, the sail frame 40 defines an arcuate shape so that the distal end 44 is generally parallel with the base frame 36 while the proximal end 42 is generally transverse to the base frame 36. Generally, the arcuate shape may define an arc of 90 degrees. The arcuate shape, in certain embodiments, may be formed by a plurality of non-curved members or portions 46.

The sail 24 is attached along a periphery of the sail frame 40, lengthwise and widthwise. As a result of the shape of the sail frame 40 the sail 24 forms an arcuate shape or, in the certain embodiments, forms a plurality of non-curved portions as the sail 24 extends from the proximal end 42 to the distal end 44.

The directional air fans 20 may include multiple, variable, high output, swivel-capable fans and associated ductwork vents, so that the directional air fans 20, and the direction of the air pressure they urge, is adjustable.

The directional air fans 20 may be mounted over various points of the track 14 by way of a plurality of mounting frames 16 so that the directional air fans 20 may urge air downwardly at an obtuse angle relative to the track 14.

Figure 2:
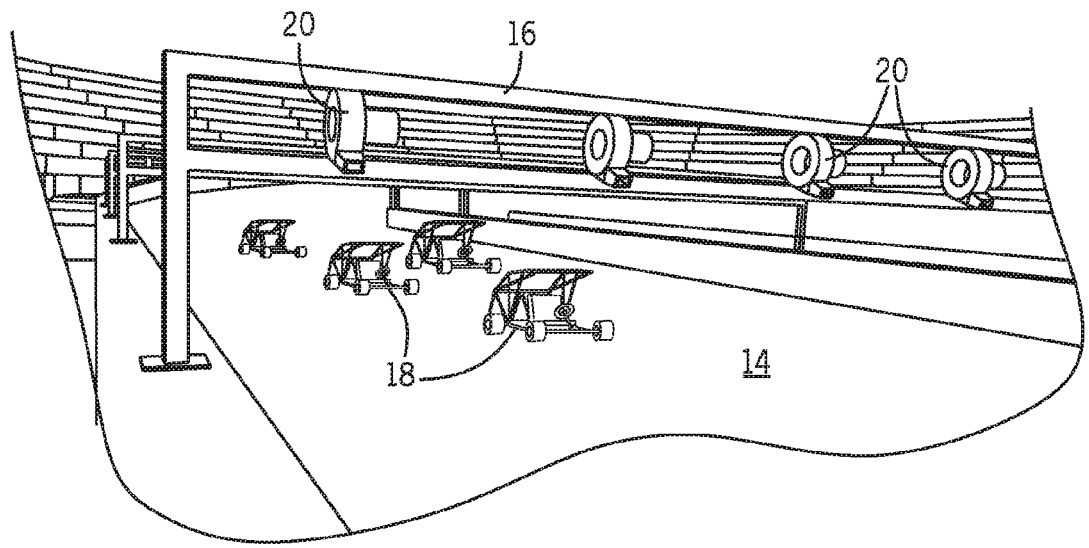
FIG. 2 is a detail perspective view of an exemplary embodiment of the present invention.

The arcuate sails 24 define a capture profile so that when the downwardly urged forces of air strikes the arcuate-shaped sail 14, a portion of the non-horizontal force vector is captured and converted into horizontal thrust against the arcuate sails 24, propelling the associated vehicle 18 along the track 14. Some of the directional air fans 20 may be directed to guide the vehicles 18 along a circular or oval-directed track 14, while others provide thrust, so that some of the directional air fans 20 are oriented in differing directions relative to each other as illustrated in FIG. 2.

The track 14 may be closed circuit track for supporting competitive racing. Such racing tracks may be asphalt, concrete or the like. Such racking track configurations may include oval, circular, straight stretch "drag race" tracks, or any shaped configuration amenable for providing competitive racing. The race tracks 14 may be incorporated into an arena 12 for hosting races events, for example "Vortex Racing League" races, as illustrated in FIG. 1. Such competitive races involve the at least one passenger using the steering apparatus 28 to guide their vehicle 18 along the race track 14 while being propelled by the air force generated by the downwardly directed directional air fans 20, as illustrated in FIG. 2. In such competitive "Vortex Racing League" races, relative to motor racing, the number of injuries are reduced and the participating passengers/drivers are people of all ages and athletic ability.

In certain embodiments, the track 14 may include surface pin and groove guidance capability adapted to interface with the pin and groove guidance capability of the vehicle steering apparatus 28 so that the vehicles 18 could be safely guided on the track 14 or pathway by a pin extending downward into a groove on the surface of the track 14, without need of human steering. A brake bar could be added to the front of each vehicle 18 in the event that it came into contact with something that was unexpectedly in its path.

Additionally, the present invention could be used for an entirely different purpose to safely transport people, finished goods, materials or parts through a factory, facility or other, either inside or outside to safely carry or transport people, finished goods, materials or parts require or engage in movement. These applications range from manufacturing to amusement park applications and everything in between. In indoor use, an additional benefit of the movement of air could be to add a filtration component to the intakes of the fans, providing clean air continuously. It is conceivable that heating and cooling vents could be added as well. In this usage, the vehicles 18 may provide a hitch 30 for attaching to a trailer 32 for carrying material 34, as illustrated in FIG. 4.

It should be understood, of course, that the foregoing relates to exemplary embodiments of the invention and that modifications may be made without departing from the spirit and scope of the invention as set forth in the following claims.

What is claimed is:

1. A transportation system, comprising:
   a track;
   at least one vehicle, each vehicle comprising:
      a base frame;
      an arcuate sail frame extending from a proximal end to a distal end, wherein the proximal end is transversely joined to a portion of the base frame so that the distal end is generally parallel with the base frame; and
      a sail attached along a periphery of the arcuate sail frame, wherein the sail defines a capture profile configured to convert non-horizontal air pressure into horizontal thrust; and
      a plurality of directional air fans, each directional air fan being mounted above the track so as to urge air at an obtuse angle relative to the track.

2. The transportation system of claim 1, wherein each directional air fan is configured to be selectively oriented in a first direction relative to a second direction of each of the other of the plurality of directional air fans.

3. The transportation system of claim 1, further comprising a pin and groove capability between the track and each of the plurality of vehicles.

4. The transportation system of claim 1, wherein the track is a closed circuit race track.

5. A method of competitive racing on a closed circuit track using the transportation system of claim 1, comprising the steps of:
   configuring the track as a closed circuit track;
   providing a plurality of the at least one vehicles; and
   orienting each of the plurality of directional air fans so as to provide horizontal thrust to each vehicle along at least a portion of the track.

6. A vehicle, comprising:
   a base frame;
   an arcuate sail frame extending from a proximal end to a distal end, wherein the proximal end is transversely joined to a portion of the base frame so that the distal end is generally parallel with the base frame; and
   a sail attached along a periphery of the arcuate sail frame, wherein the sail defines a capture profile configured to convert non-horizontal air pressure into horizontal thrust.

7. The vehicle of claim 6, wherein the sail frame further comprises a plurality of linear members.

8. The vehicle of claim 7, wherein the sail defines an arcuate shape comprising linear portions.

* * * * *